United States Patent [19]

Fleck et al.

[11] 4,132,075
[45] Jan. 2, 1979

[54] METHOD OF PRODUCING MECHANICAL ENERGY FROM GEOTHERMAL BRINE

[75] Inventors: Raymond N. Fleck, West Covina; Harvey Hennig, Fullerton, both of Calif.

[73] Assignee: Union Oil Company of California, Brea, Calif.

[21] Appl. No.: 811,680

[22] Filed: Jun. 30, 1977

[51] Int. Cl.² .................................................. F03G 7/00
[52] U.S. Cl. ......................................... 60/641; 60/649; 203/11; 203/73; 203/DIG. 16; 203/DIG. 20
[58] Field of Search ..................... 60/641, 649; 165/45; 203/11, 173, DIG. 16, DIG. 20

[56] References Cited

U.S. PATENT DOCUMENTS

| | | | |
|---|---|---|---|
| 3,845,627 | 11/1974 | Hutchinson | 60/641 |
| 3,972,193 | 8/1976 | Sherwood | 60/641 |

Primary Examiner—Allen M. Ostrager
Attorney, Agent, or Firm—Richard C. Hartman; Dean Sandford; Daniel R. Farrell

[57] ABSTRACT

A method for producing mechanical energy from geothermal brine in which a heat transfer fluid (HTF) is heated by direct contact with the hot geothermal brine in cocurrent flow through a series of flash stages which are maintained at successively lower pressures so that the HTF is vaporized in each stage. A working fluid is countercurrently flowed through the series of flash stages in indirect heat exchange with the vapor produced in each stage so that the vapor is condensed in each stage and the working fluid is progressively heated as it passes through the series of flash stages. The heated working fluid is utilized in a heat engine for the production of mechanical energy.

28 Claims, 6 Drawing Figures

METHOD OF PRODUCING MECHANICAL ENERGY FROM GEOTHERMAL BRINE

BACKGROUND OF THE INVENTION

1. Field of the Invention

The invention relates to a method for utilizing thermal energy contained in subterranean formations to produce mechanical energy, and particularly to an improved method for utilizing the heat content of geothermal brine to generate electricity.

2. Description of the Prior Art

Sources of geothermal energy are found in many parts of the world, and while a few of these sources provide dry steam which is particularly useful for the production of useful energy, and some may provide wet steam, the remaining sources provide only hot geothermal brine. Because geothermal brines contain significant amounts of dissolved salts and suspended solids, past attempts to utilize these brines in the production of useful energy have been only of limited success due to the problems of scaling, plugging and corrosion of process equipment.

In one method for utilizing geothermal brine to produce mechanical energy, the hot geothermal brine is heat exchanged with a working fluid in conventional indirect heat exchange equipment in which the brine and working fluid directly contact the heat exchange surfaces of the heat exchanger; however, due to direct contact of the brine, extensive corrosion and fouling of the heat exchanger will result. Another method, disclosed in U.S. Pat. No. 3,988,895 to Sheinbaum, involves direct heat exchange of a working fluid with the hot brine. The working fluid is vaporized and the vapor is fed to a turbine for the production of mechanical energy. Still another method, disclosed by Sheinbaum and U.S. Pat. No. 3,845,627 to Hutchinson, involves direct heat exchange of a heat transfer fluid (HTF) with the brine. The hot HTF is separated from the brine and in an associated heat exchanger the hot HTF is employed to heat a working fluid by indirect heat exchange. The heated working fluid is subsequently fed to a heat engine for the production of mechanical energy. These latter methods have the disadvantage that the hot HTF removed from the direct exchanger will unavoidably carry entrained salts and other solids to the turbine or associated indirect heat exchangers, thereby causing scaling and corrosion. Also, the residual brine will still contain a large amount of unrecovered thermal energy; and furthermore, since an appreciable amount of steam is produced in the direct contact exchanger, the salt and solids content of the residual brine will increase, and as the brine temperature is reduced, the solubilities will decrease, causing more precipitation, scaling and corrosion.

Thus, there is a need for a method of producing mechanical energy which utilizes geothermal brine, wherein the problems of scaling, corrosion and precipitation associated with the prior art methods are avoided.

A device that has been successfully employed in the desalination of sea water is the multistage flash heat exchanger. U.S. Pat. No. 3,972,193 to T. K. Sherwood discloses the use of a multistage flash heat exchanger to produce mechanical energy from geothermal brine. In this method the brine is flowed through a series of flash stages which are maintained at successively lower pressures so that the brine is partially flashed to vapor in each stage, a working fluid is countercurrently flowed through the series of stages in indirect heat exchange with the water vapor produced in each stage so that the water vapor is condensed in each flash stage and the working fluid is progressively heated, and the heated working fluid is used in a heat engine to produce mechanical energy. It has been found that although this method is successful in reducing the amount of scaling, corrosion and precipitation as compared to the other prior art methods, the application of this method is restricted due to the use of flashed steam as the heat transfer medium by the flashing characteristics of the geothermal brine and is accordingly relatively inflexible.

Accordingly, a principal object of this invention is to provide a method for producing energy from geothermal brine without the deleterious effects of corrosion, scaling and plugging due to suspended solids and dissolved salts and which can be applied to a wide variety of geothermal brines.

Another object of this invention is to provide a method for producing mechanical energy from geothermal brine which does not require the brine to contact a heat exchange surface.

Yet another object of this invention is to provide a flexible method for recovering the thermal energy contained in hot geothermal brine and utilizing the recovered thermal energy to produce mechanical energy.

A further object of this invention is to provide a method for producing mechanical energy from geothermal brine, in which brine-produced vapors are not fed to the heat engine.

A still further object of this invention is to provide a flexible method which through proper choice of a heat transfer fluid, a working fluid and operating conditions can be successfully utilized to produce mechanical energy from a wide variety of geothermal brines.

Further objects and advantages of this invention will be apparent to those skilled in the art from the following description taken in conjunction with the accompanying drawings.

SUMMARY OF THE INVENTION

Briefly, the method of this invention comprises the steps of producing hot geothermal brine from a subterranean geothermal reservoir; heating a heat transfer fluid (HTF) by direct contact with the hot brine in cocurrent flow through a series of flash stages which are maintained at successively lower pressures so that the HTF is vaporized in each stage, countercurrently flowing a working fluid through the series of flash stages in indirect heat exchange with the vapor produced in each stage so that the vapor condenses in each stage and the working fluid is progressively heated as it passes through the series of flash stages; and then utilizing the heated working fluid in a heat engine for the production of mechanical energy. The HTF vapors condensed in each stage are collected and mixed with the brine entering the subsequent stage.

In one preferred embodiment, the steam and noncondensible gases produced with the hot brine are separated from the brine in an initial separation step and employed to vaporize and/or superheat the hot working fluid exiting from the series of flash stages by indirect heat exchange. The noncondensibles are removed and the steam condensate is returned to the brine prior to entry to the first of the series of flash stages.

In another preferred embodiment, the heat transfer fluid is selected and the pressures of each of the flash stages are maintained sufficiently high such that no more than 10 percent of the vapor produced in each flash stage is water vapor, thereby preventing concentration of the dissolved salts and suspended solids.

Exemplary of the heat engines useful in the method of this invention are steam turbines, steam engines, gas turbines and other prime movers capable of utilizing a heated working fluid in the production of mechanical energy. In the most practical application of this invention, a turbine will be used to produce the mechanical energy to drive an electrical generator for the production of electrical power.

This invention provides the important advantage of not allowing the hot geothermal brine to directly contact a heat exchange surface. Another important advantage is that the mechanical energy can be produced from a wide variety of geothermal brines and without having brine-produced vapors fed to the heat engine. A further advantage is that the working fluid can be heated to a temperature very near the temperature of the produced geothermal brine. This is accomplished through the use of an incremental pressure reduction in each successive flash stage. For each incremental reduction in pressure, the temperature is incrementally reduced, thereby allowing the countercurrently flowing working fluid to be progressively heated to a temperature near the temperature of the produced geothermal brine. Because a minimum of steam is produced in each stage and any steam condensate produced is returned to the brine, the concentration of dissolved salts and suspended solids remains essentially constant throughout the process, thereby reducing the precipitation and scaling problems which are attributable to these constituents of the brine.

BRIEF DESCRIPTION OF THE DRAWINGS

The invention will be more readily understood by reference to the accompanying drawings, wherein like numerals refer to like elements, and in which.

DETAILED DESCRIPTION OF THE INVENTION

Figure 1:
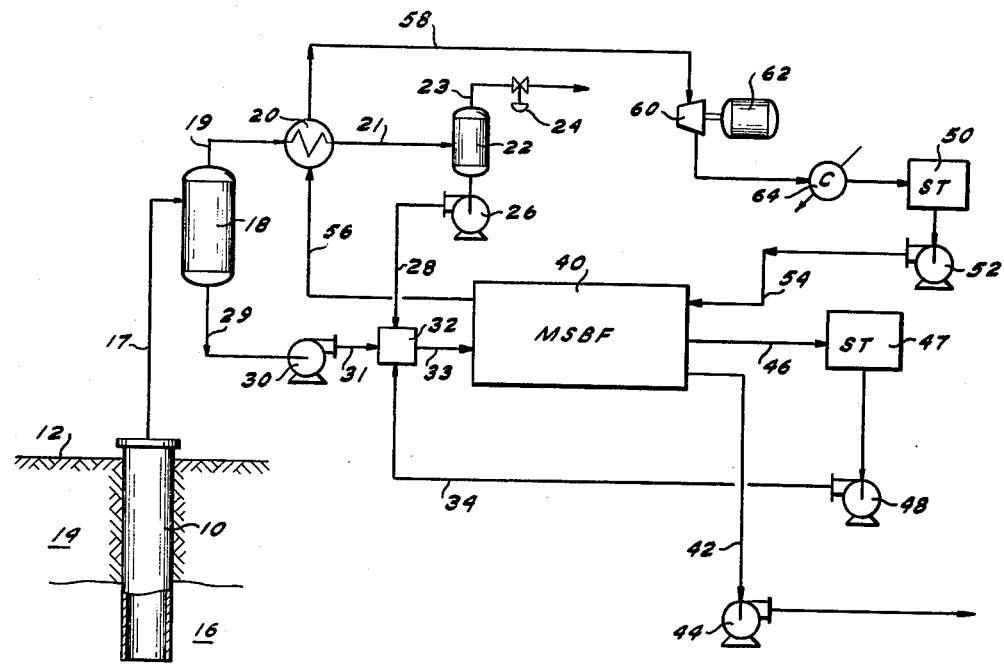
FIG. 1 is a schematic flow diagram of a process employing one embodiment of the method of this invention.

The method of this invention, as hereinafter described in greater detail, provides for the production of mechanical energy from geothermal brine. The method involves first producing the hot geothermal brine from a subterranean geothermal brine reservoir via one or more production wells. Geothermal brine reservoirs are found at varying depths, most ranging from 1,000 feet to 5,000 feet or deeper; and the temperature of the brine can vary from ambient temperature to about 700° F. or higher, with many reservoirs containing brines having temperatures in the range of 250° F. to 700° F.

Several methods can be employed to deliver the geothermal brine to the surface. Although the pressures within the geothermal brine reservoirs are high, they are typically insufficient to naturally flow the brine to the surface; therefore, either a surface or downhole pump may be required to produce the geothermal brine. It may be desirable, once the flow of brine is initiated and the hotter brine is subjected to the lower pressures in the upper portion of the well, to allow the brine to partially flash so as to help sustain the upward flow of brine. With whatever method is selected, a pressure control valve, in conjunction with a steam separator, may be used to control the pressure of the brine produced at the surface and the amount of brine that is allowed to flash into steam. Because allowing the brine in the production well to flash results in a substantial decrease in the temperature of the recoverable heat and energy, and the precipitation and deposit of minerals, and because it is preferred to produce as much brine as possible at the highest temperature with no precipitation of minerals, the amount of brine that flashes should be kept to a minimum. Therefore, it is preferred to produce the hot geothermal brine at a superatmospheric pressure exceeding its vapor pressure to maintain the brine in the liquid phase.

Once brought to the surface, if the pressure of the produced geothermal brine is too high for use in the available heat exchanger, the brine can be partially flashed to steam prior to its introduction into the heat exchanger in order to reduce the pressure of the brine. The residual brine from the partial flashing can then be introduced into the heat exchanger. In one embodiment of the method of this invention, the steam flashed or separated from the brine is condensed by indirect heat exchange with the working fluid conducted from the multistage heat exchanger, and the steam condensate thus obtained is mixed with the residual brine. Separation of the non-condensible gases from the steam condensate is facilitated by this step and the full thermal energy of the steam is utilized in heating the working fluid. The brine and steam condensate mixture is preferably conducted to the multistage heat exchanger at a pressure exceeding its vapor pressure to maintain the brine in the liquid phase. In a particularly preferred embodiment, the heat transfer fluid is selected and the brine is pressurized sufficiently to assure that relatively little and preferably no more than 10 percent of the vapor produced in each stage is water vapor.

Prior to entry into the first stage of the heat exchanger, the brine is mixed with a heat transfer fluid (HTF) which is characterized by its insolubility in the brine and a lower boiling point than the brine. The temperature of the fluids entering the first flash stage of the heat exchanger may range from about 250° F. to about 650° F. or above and typically from about 300° F. to about 500° F. The pressure of the fluids prior to entry into the first stage should be above the vapor pressure of the entering fluids. The first flash stage is maintained at a pressure less than the vapor pressure of the entering fluids but preferably above the pressure at which any significant flashing of the brine occurs. As a result, the incoming fluids partially flash, producing HTF vapor and a minor amount of steam, as well as HTF liquid and brine, all at a slightly lower temperature. The vapor contacts and condenses upon the surface of a heat exchange conduit which passes through the vapor space of the flash stage and which countercurrently conducts the cooler working fluid through the multistage binary flash heat exchanger. By condensing on the surface of the heat exchange conduit, the vapor yields its heat of condensation to the cooler working fluid by indirect heat exchange. Because relatively pure HTF vapor contacts the heat exchange conduit, scaling and corrosion of the heat exchange conduit is substantially eliminated. The condensed vapors are then allowed to drip into a collection pan which prevents contact of the cooler condensate with the brine in the same stage. The condensate, i.e. the condensed HTF vapors and steam, is conducted into the second flash stage and is mixed with the brine entering the second flash stage to reheat the HTF condensate by direct heat exchange and to return the condensate from any steam produced in the first stage to the brine. The second flash stage is maintained at a pressure lower than the first flash stage and lower than the vapor pressure of the fluids entering the second stage, but preferably above the pressure at which any significant flashing of the brine occurs. As a result, the above-described flashing-condensation process is repeated. Because any significant flashing of the brine is prevented, the salt and mineral concentration of the brine is not increased and the problem of precipitation of salts and solids, and the plugging that would result are thereby greatly reduced. And since the cool HTF condensate from each flash stage is not allowed to mingle with the liquids in that stage, the temperature of each stage is higher and correspondingly the temperature of the working fluid exiting the stage will be higher.

The quantity and temperature of the vapor produced in each flash stage will depend on the relationship of the pressure in that stage to the vapor pressures of the entering fluids. It is desired in the practice of this invention to produce vapor at the highest possible temperature, thereby enabling the working fluid to be heated to the highest possible temperature. This is accomplished by passing the heat transfer fluid and brine successively through a series of flash stages wherein the pressure of the fluids are reduced in small increments rather than in a single stage subject to a large drop in pressure. While the total quantity of energy provided by a single stage subjected to one large pressure drop may be equal to that provided by a series of incremental pressure drops, reduction of the pressure in a series of incremental pressure drops provides that energy at much higher temperatures, thus enabling the working fluid to be heated to the highest possible temperature. Because of the countercurrent flow of the working fluid, it will always have a temperature lower than the vapor temperature in the same flash stage, thus facilitating both condensation of the vapor and heat transfer to the working fluid. This process can be repeated in successive stages until the temperature of the working fluid approaches the initial temperature of the produced brine. The indirect heat exchange of the working fluid from the first flash stage with the steam separated from the produced brine, as discussed above, provides the highest possible temperature of the working fluid.

While the first flash stage is preferably above atmospheric pressure, the latter flash stages of the heat exchanger can be maintained at subatmospheric pressures. In fact, in some cases, this is preferred. Because it is desired to bring the temperature of the HTF vapor down to near the initial temperature of the working fluid which is typically below the normal boiling point of the effluent HTF, it may be necessary to flash the heat transfer fluid at subatmospheric pressure in the latter stages. When the pressure in the last flash stage is maintained at subatmospheric pressure, it will be necessary to pump the brine and HTF condensate from the last stage.

It is preferred in the practice of this invention that the flash stages be free of all gases except the HTF vapor and a minor amount of steam. It may be necessary before or during startup of the process to evacuate the gases by means of vents at the top of the vapor space. During operation, the noncondensible gases evolved during the reduction in the pressure of the brine can be removed by use of the aforementioned vents to regulate the pressure within each stage.

The heat transfer fluid can be any of a variety of fluids; but the HTF is preferably immiscible with the brine, has a lower specific gravity than the brine, and has a lower boiling point than the brine at all the pressures encountered in the multistage flash exchanger. Exemplary heat transfer fluids include low molecular weight alkanes having between 3 and 6 carbon atoms, such as propane, butane, isobutane, pentane, isopentane, and hexane. Although mixtures of these fluids can be employed, substantially pure, single component heat transfer fluids are preferred in order that the heat transfer liquid vaporize at a substantially constant temperature which is dependent on the pressure. Since the heat transfer fluid is preferably transferred from one flash stage to the next only by vaporization and condensation, the use of a mixture having a broad range of boiling points could cause a holdup of the higher boiling components in each stage. Particularly preferred heat transfer fluids are n-butane, isobutane and n-pentane.

The selection of a heat transfer fluid (HTF) for a particular application of the method of this invention is critical and depends primarily upon the properties of the produced geothermal brine. The vapor pressure of the HTF should be higher than the vapor pressure of the brine at the same temperature such that at least half of the vapor produced in each flash stage is HTF vapor. Preferably, the vapor pressure of the HTF selected is at least about eight times the vapor pressure of the brine at the same temperature and a sufficient quantity of the HTF is provided so that the vapor produced in each stage contains no more than about 10 percent water vapor, i.e. the partial pressure of the water vapor in each stage is no more than 10 percent of the total pressure, in order that the amount of steam flashed from the brine is minimized. It is contemplated that the heat transfer fluid can be selected such that substantially all of the HTF is vaporized upon entering each stage and only a very small amount of liquid HTF forms a layer on the brine. However, it is preferred that the HTF is selected and a sufficient quantity of HTF is provided such that a significant layer of liquid HTF floats on the brine in each stage. The floating HTF layer serves several useful purposes including suppressing the production of steam and scrubbing entrained salts from the steam which must pass through the layer. The suitability of a heat transfer fluid for a particular application of the method of this invention should be obvious from this description and is easily determined by the usual comparisons of temperature-pressure-enthalpy diagrams of the heat transfer fluid and the properties of the produced brine.

It is also contemplated that more than one heat transfer fluid loop using the same or different fluids can be employed in the method of this invention or that a portion of the heat transfer fluid can be added to or removed from various flash stages in the series of flash stages in order to optimize the overall efficiency of the process. Such modifications are within the skill of the art and are a matter of choice which can be decided by the usual optimization of operating parameters made in view of the properties of the available geothermal brine and number of flash stages.

The working fluid can also be any of a wide variety of fluids, including water; low molecular weight hydrocarbons, such as methane, ethane, propane, butane, isobutane, pentane, isopentane; ammonia, or a fluorinated hydrocarbon. The working fluid can also be a multicomponent fluid. A multicomponent fluid, as defined herein, is a mixture of two or more fluids which boils over a range of temperatures, boiling beginning at its bubble point and vaporization being complete at its dew point. Because the temperature of the multicomponent fluid continuously increases as the fluid boils rather than undergoing a period of constant-temperature boiling, a more uniform temperature differential between the working fluid and the HTF vapor in each flash stage can be maintained, thereby allowing the working fluid to be heated to a higher temperature. Conversely, because a multicomponent fluid condenses over a range of decreasing temperatures rather than at a constant temperature, thereby providing a more uniform temperature differential between it and the cooling fluid, the amount of cooling fluid required and the size of the condenser can be reduced. Exemplary multicomponent fluids include a mixture of two or more of the fluorinated hydrocarbons, a mixture of butane and pentane, or a mixture of methane, ethane and butane. One preferred multicomponent fluid is a mixture of water and ammonia, such as a mixture containing about 20 percent ammonia and 80 percent water. Another preferred multicomponent fluid is a mixture of propane, isobutane and isopentane, such as 25 percent propane, 50 percent isobutane and 25 percent isopentane. Regardless of the specific fluid chosen, it is preferred that the fluid have a low-salt content, such as less than 100 ppm of total dissolved salts. If a high-salt content fluid were chosen, such as brine, severe plugging and corrosion would occur within the heat exchange tubes and the heat engine. The working fluid will be selected for optimum performance in view of the available brine temperature and pressure, and the heat transfer fluid selected.

The working fluid leaving the multistage heat exchanger may be a liquid, a vapor, a liquid-vapor mixture, or a superheated vapor; however, because the preferred heat engine is a turbine, it is preferred that at least a portion of the working fluid be vaporized in the heat exchanger, and more preferably that the working fluid leave the heat exchanger as a superheated vapor. Further vaporization and/or superheat is preferably provided by the indirect heat exchange with the steam initially separated from the produced brine. Multicomponent working fluids are particularly preferred where the fluid is to be vaporized in the multistage heat exchanger.

Referring now to the drawings, FIG. 1 illustrates one preferred embodiment of the method of this invention. As shown in FIG. 1, a geothermal brine production well 10 extends from the earth surface 12, through an earth formation 14, and into a geothermal brine reservoir 16, which contains hot geothermal brine. Earth formation 14 is typically of low permeability, and therefore serves to confine the hot geothermal brine within reservoir 16 and inhibits the diffusion of heat throughout the formation.

The geothermal brine is delivered to the surface through production well 10 by a subsurface pump, not shown, and is maintained at a pressure exceeding its vapor pressure to prevent flashing within the reservoir or in the production well. The subsurface pump, mentioned above, serves to provide the necessary pressure to minimize flashing and maintain the brine in the liquid phase. By preventing flashing in the well, heat and temperature losses can be kept to a minimum. Also, the deposition of any substantial mineral deposits in the well can be prevented.

At the surface, the geothermal brine is conducted by a conduit 17 to an optional vapor/liquid separator 18 which separates non-condensible gases and any flashed steam from the brine. If a reduction in pressure of the hot brine is required to avoid overpressuring of the multistage heat exchanger, a pressure reducing device, not shown, is employed prior to the separator 18 to effect flashing of a portion of the brine. The separated vapors can be discharged, but preferably are conducted through a conduit 19 to a condenser 20 wherein the steam is condensed by indirect heat exchange with the working fluid. The steam condensate and noncondensible gases are conducted by a conduit 21 to a second vapor/liquid separator 22. The noncondensibles are vented from separator 22 through a conduit 23 and a valve 24 or may be routed to a gas treating plant, not shown, for removal of any contaminant gases, such as hydrogen sulfide.

The hot brine from separator 18 is conducted by a conduit 29 to a mixing device 32. Preferably the brine is pressurized by a pump 30 to increase its pressure above its vapor pressure. In mixing device 32, the brine is mixed with a heat transfer fluid which is introduced through a conduit 34 and preferably is also mixed with the steam condensate produced in condenser 20. The steam condensate is removed from separator 22 by a pump 26 and conducted to mixing device 32 by a conduit 28. Mixing device 32 can be a pump, a mixing valve or orifice, or a small contacting chamber, but preferably it is a static mixer of the type used to "fold" two-phase streams into each other to effect thorough contacting. Alternatively, the heat transfer fluid and steam condensate can be conducted to the suction of pump 30 and the required mixing will occur therein eliminating the requirement for a separate mixing device. The effluent fluids, i.e. the brine and HTF, from mixing device 32 should be at substantially the same temperature and at a pressure higher than the vapor pressure of the fluids.

From mixing device 32, the fluids are conducted by a conduit 33 into a multiple stage binary flash heat exchanger (MSBF) 40. The brine and heat transfer fluid flow cocurrently through the MSBF, wherein a significant portion of the thermal energy of the fluids is transferred to the working fluid which flows countercurrently through the vapor space of the MSBF. The brine, at a lower temperature and pressure, exits the MSBF through a brine outlet conduit 42 with the aid of a pump 44, if necessary, for suitable disposal. If desired, the brine can be injected back into the geothermal brine reservoir through an injection well, not shown, in order to replenish the supply of brine in the reservoir and/or to prevent land subsidence. If the brine is injected back into the reservoir, the reinjection well should be displaced a substantial distance from the production well so as not to overly cool the brine that is being produced. The cool heat transfer fluid exits the MSBF through an outlet conduit 46 and is stored in a surge tank 47. The heat transfer fluid is drawn from tank 47 by a pump 48 and recycled through conduit 34 to mixing device 32.

Also shown in FIG. 1 is a closed working fluid circuit. The working fluid is pumped from a surge tank 50 by a pump 52 and through fluid inlet conduit 54 into the MSBF. The fluid is then conducted by one or more heat exchange conduits through the vapor space of the MSBF wherein the working fluid is heated and preferably vaporized for use in a turbine. The heated working fluid exits from the MSBF through outlet conduit 56 and preferably is vaporized and/or superheated by indirect heat exchange in heat exchanger 20. The working fluid vapors are conducted by a conduit 58 to a turbine 60 and produce the mechanical energy necessary to drive a generator 62 for the generation of electrical power. The spent working fluid exits turbine 60 and is condensed in a condenser 64 by indirect heat exchange and is conducted back to surge tank 50 for recycling.

The multistage binary flash heat exchanger (MSBF) useful in the method of this invention can be constructed in many ways. Essentially it consists of a series of separate flash stages through which the heat transfer fluid (HTF) and brine are successively flowed. Liquid passages connect adjacent stages and are so disposed as to prevent vapor communication between stages. Preferably separate liquid passages are provided to allow passage of the brine and the HTF condensate between flash stages. The necessary pressure differential between adjacent flash stages is provided by pressure control devices. The MSBF also includes one or more heat exchange conduits which conduct the working fluid countercurrently through the vapor space of the series of stages and provide for indirect heat exchange between the working fluid and the vapors produced in each flash stage. The heat exchange conduits are so disposed that neither the hot geothermal brine nor the liquid heat transfer fluid is in contact with the heat exchange surface.

Figure 2:
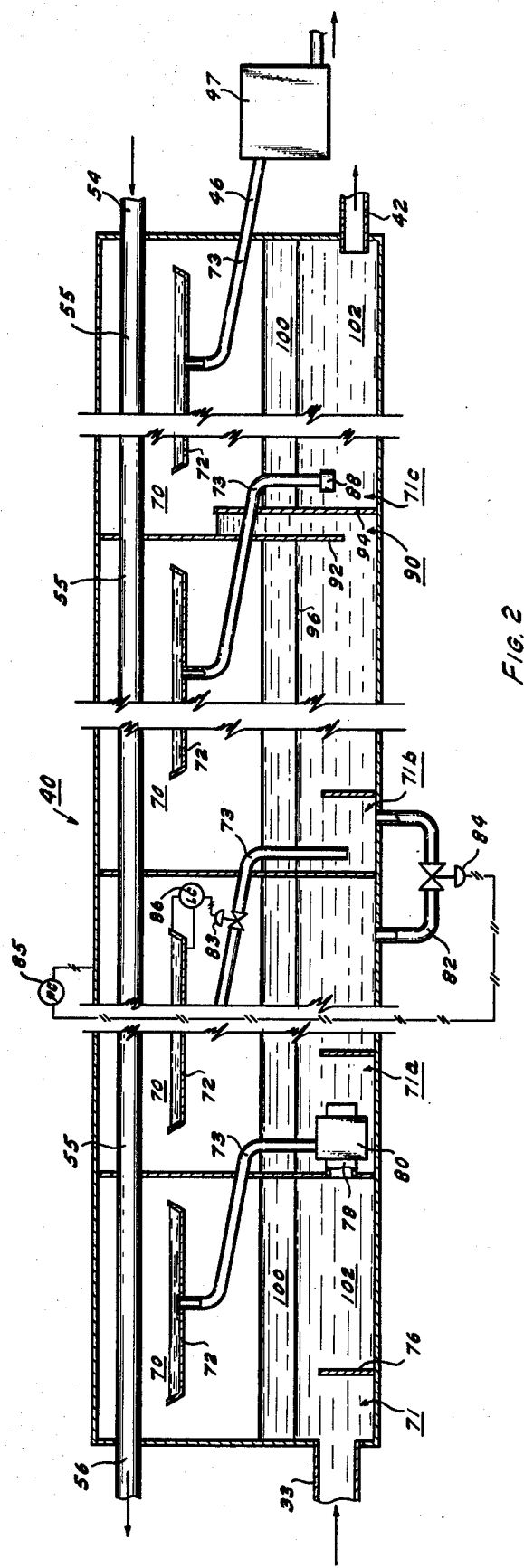
FIG. 2 is a vertical cross-sectional view of one embodiment of the multistage binary flash heat exchanger useful in the practice of the method of this invention and illustrates several embodiments of the pressure control devices suitable for use to control the pressure between stages of the multistage binary flash heat exchanger.

FIG. 2 illustrates one embodiment of the MSBF for recovery of the thermal energy of the hot geothermal brine. Multistage flash heat exchangers are well-known in the art of seawater desalination, wherein seawater is conducted by conduits passing through the vapor space of a multistage flash unit to preheat the seawater, which is then heated by an external source and flowed through the multistage flash unit, whereby the heated seawater flashes and condenses on the exterior surface of the conduit conducting the colder seawater. The condensate is then collected as the fresh water product. U.S. Pat. No. 3,152,053 to J. P. Lynam illustrates one such multistage flash unit suitable for use in seawater desalination and is herein incorporated by reference.

The MSBF 40, as shown in FIG. 2, is a long tunnel-like structure and is constructed of concrete, coated metal or other material suitable for use with hot geothermal brine. The MSBF comprises a series of longitudinally disposed chambers 70, each of which has a fluid inlet section, shown generally as 71, for receiving liquids from the previous stage. A heat exchange conduit 55 communicating with inlet conduit 54 for receiving cold working fluid therefrom is disposed in the vapor space of each chamber 70 and communicates with outlet conduit 56 for exhausting heated working fluid thereto. Also in the vapor space of each chamber 70 is a condensate collection pan 72 disposed under conduit 55 for catching the condensate formed on conduit 55. A drain conduit 73 provides fluid communication between pan 72 of each stage and the inlet section 71 of the next stage or, in the last stage, provides fluid communication between pan 72 and outlet conduit 46 for transfer of the HTF condensate to surge tank 47.

Various embodiments of the inlet section 71 are illustrated in FIG. 2. Inlet section 71 for the first stage consists of conduit 33, which conducts the mixture of heat transfer fluid and brine from mixing device 32 to the first stage, and a baffle 76 which prohibits short circuiting of the fluids to the inlet 71a of stage two.

One preferred embodiment of inlet section 71 for communication between adjacent stages in the MSBF is shown generally as section 71a and comprises drain conduit 73 and a brine inlet conduit 78, both communicating with a mixing device 80. Mixing device 80 can be a mixing valve or orifice or can be a static mixer provided with means to effect the pressure drop between the stages. The condensate from conduit 73 is preferably thoroughly mixed with the brine from conduit 78 to effect temperature equalization. Additionally, the pressure of the fluids is decreased to effect vaporization of the reheated heat transfer fluid.

Another embodiment of inlet section 71 is shown generally as 71b and comprises an automatic control valve 83 for controlling the flow of condensate through drain conduit 73, and an automatic control valve 84 for controlling the flow of brine through brine conduit 82. Brine control valve 84 is automatically adjusted by a pressure controller 85 which is sensitive to the pressure in the chamber 70, and condensate control valve 83 is automatically controlled by a levelcontroller 86 which is sensitive to the fluid level in pan 72. The outlet of conduits 73 and 82 are preferably disposed such that they discharge in opposing directions into a relatively small volume chamber, thereby effecting thorough contacting of the two fluids. As discussed previously, a reduction in fluid pressure is essential to effect vaporization of the heat transfer fluid.

A third, very simple embodiment of inlet section 71 is shown generally as 71c and is essentially a weir-type gate, shown generally as 90, to provide a passageway for the brine, and a spray nozzle 88 disposed at the discharge end of conduit 73. Weir gate 90 comprises a partition 92 and a weir 94. Partition 92 extends from the top of the chamber to a point near the bottom of the chamber and preferably below the heat transfer fluid/brine interface 96. Weir 94, positioned a short distance downstream from partition 92, extends from the bottom of each chamber to an intermediate point above the liquid level in the upstream chamber. The design of such a weir-type seal is well known in the art and is fully described in U.S. Pat. No. 3,972,193 to Sherwood which is herein incorporated by reference. The brine discharged over the top of weir 94 falls through the heat transfer fluid layer 100 thereby transferring some of its thermal energy to the HTF. Also the HTF condensate from the upstream chamber is discharged through spray nozzle 88 into the brine layer 102 to provide further mixing and effect heat transfer to the HTF.

Although only one heat transfer conduit 55 is shown in FIG. 2, it will be understood of course that one or more conduits can be used and the design and configuration of the conduits are a matter of choice dependent upon the temperature encountered, the type and quantity of heat transfer fluid and working fluid used and the type of heat engine employed.

Figure 3:
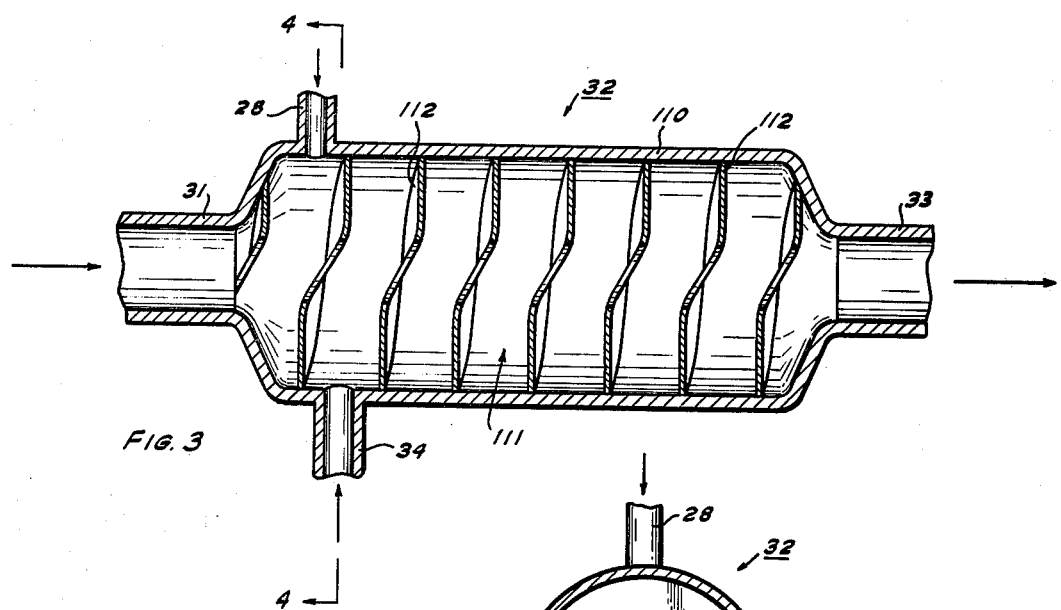
FIG. 3 is a vertical cross-sectional view of one embodiment of the mixing device useful in the practice of the method of the invention.
Figure 4:
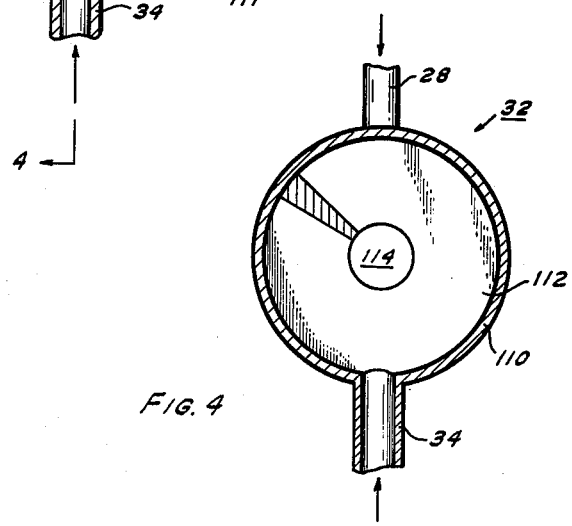
FIG. 4 is a vertical cross-sectional view taken along line 4—4 of FIG. 3.

One embodiment of the static mixing device preferred for use in the method of this invention is illustrated in FIGS. 3 and 4. Mixing device 32 includes an outer shell 110 defining a mixing chamber 111, and a spiral vane 112 disposed within chamber 111. As is best seen in FIG. 4, spiral vane 112 does not completely traverse the cross-section of chamber 111 but rather leaves an unrestricted, small diameter path 114 disposed longitudinally within chamber 111. Conduits 31, 28 and 34 are provided at the inlet end of mixing device 32 for conducting the brine, steam condensate and heat transfer fluid, respectively, into chamber 111. Conduit 33 is provided at the outlet end of mixing device 32 for conducting the mixed fluids from chamber 111 to MSBF 40.

The brine, HTF and steam condensate introduced to mixing device 32 are folded into each other by spiral vane 112 and are thereby sufficiently contacted to transfer heat from the hot geothermal brine to the cooler heat transfer fluid. The sizing of path 114 and spiral vane 112 are not critical but should interact to provide good heat transfer and effect no more than an acceptable pressure drop. Preferably, device 32 is designed to have a minimal pressure drop and still achieve good heat transfer between the fluids.

Mixing device 80 shown in FIG. 2 can also be a static mixing device of the type illustrated in FIGS. 3 and 4. Mixing device 80 can be designed to effect the desired pressure drop between flash stages, or alternatively, mixing device 80 can be designed for minimal pressure drop and a pressure control valve (not shown) can be added upstream or downstream of device 80.

In the practice of the method of this invention, it is preferred that the temperature of the brine entering the first flash stage be above about 250° F., more preferably above about 300° F., and most preferably above about 350° F. However, due to the flexibility of the method of this invention, which is attributable to the ability to select (1) different heat transfer fluids and working fluids, (2) the ratio of these fluids to each other and to the available brine and (3) the flash pressure in each stage, the method is particularly suited for the production of mechanical energy from lower temperature geothermal brines. The method can recover mechanical energy from geothermal brines with temperatures of 150° F. and lower, although economical considerations at the lower temperatures may render the recovery of mechanical energy from the brine impractical.

Since one important benefit provided by the method of this invention results from the incremental reductions in vapor temperature, it is desired to maintain the pressures in the flash stages such that the brine is cooled by not more than about 35° F. per flash stage, and preferably between about 1° F. and 10° F. per flash stage. It is also preferred that the geothermal brine in the last flash stage be cooled to below about 150° F.

Since at higher temperatures a greater pressure reduction is required to produce a given temperature drop, the amount of pressure drop between the early stages may need to be greater than those in the later stages, or it may be preferred to avoid the need for large pressure reductions by having the brine undergo small temperature reductions in the early stages with temperature reductions becoming larger as the fluids are flowed through successive stages. If a uniform temperature reduction in each stage is desired, then the throttling of the HTF and brine fluid streams from the first stage will be the greatest, with the throttling of each stage thereafter being progressively less. However, while it may be preferred to have uniform temperature reductions between adjacent stages, this is not necessary.

The invention is further described by the following example which is illustrative of a specific mode of practicing the invention and is not intended as limiting the scope of the invention as defined by the appended claims.

EXAMPLE

Hot geothermal brine at 500° F. downhole temperature is produced from a geothermal reservoir via a production well and processed in accordance with the method of this invention and substantially in accordance with the flow diagram illustrated in FIG. 1. The brine is partially flashed at 200 psia to produce steam equivalent to about 15 percent of the produced brine. The steam and noncondensible gases are separated from the residual brine and are conducted through an indirect heat exchanger to condense the steam. The noncondensible gases are vented. The residual brine and steam condensate are pressurized to prevent flashing prior to entry into the multistage heat exchanger and are contacted in a static mixer with a n-pentane heat transfer fluid recycled from the last flash stage of the MSBF. The fluids are conducted to the first stage of the MSBF which is controlled at a pressure of about 495 psia to maintain a temperature of 350° F.

Figure 5:
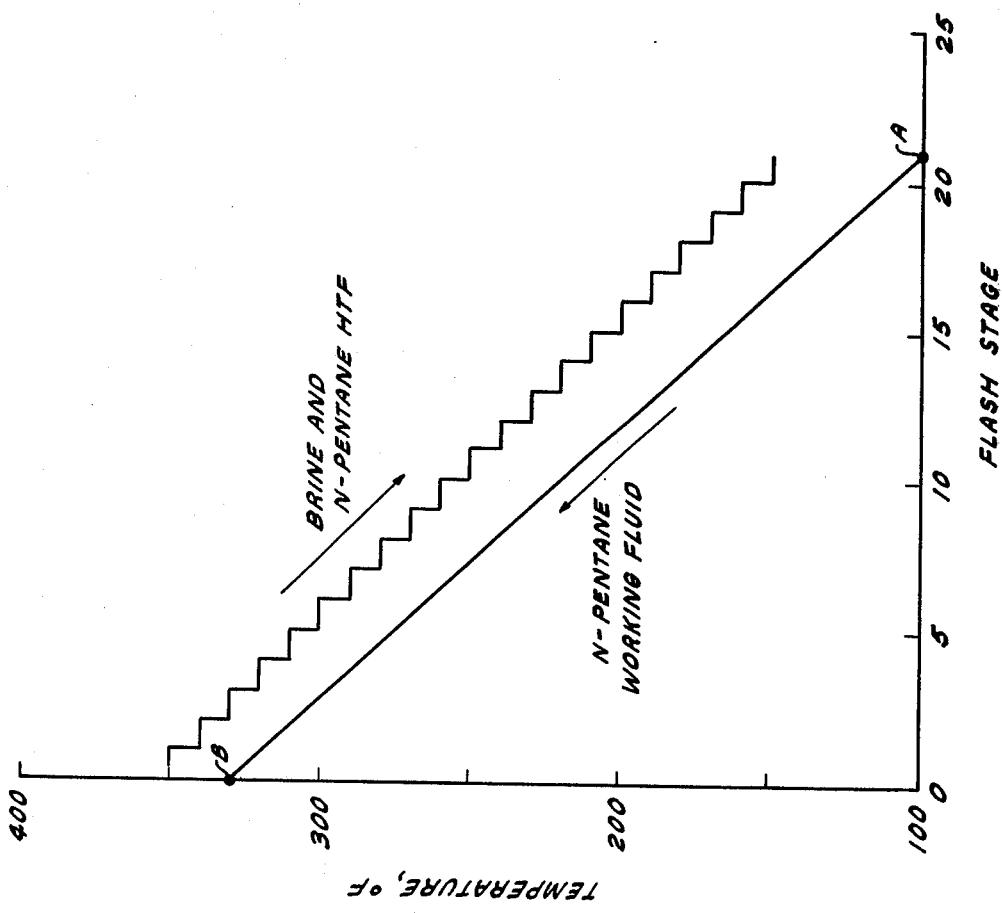
FIG. 5 is a graph illustrating the temperature of the brine, the heat transfer fluid and the working fluid as a function of the location in an examplary multistage binary flash heat exchanger.

Referring to FIG. 5, the brine and n-pentane heat transfer fluid are passed through a series of 21 flash stages, the pressures of which are controlled to achieve a 10° F. temperature drop between adjacent flash stages. In the first stage the vapor produced comprises about 10 percent water vapor and 90 percent n-pentane. The compositions of the vapor produced in each stage vary and in the last stage, at about 150° F. and 41 psia, the vapor produced is about 2.5 percent water vapor and 97.5 percent n-pentane. As is shown in FIG. 5, the brine and n-pentane are successively cooled from 350° F. to 150° F. and the countercurrently flowing n-pentane working fluid is progressively heated from 100° F. to about 330° F.

Figure 6:
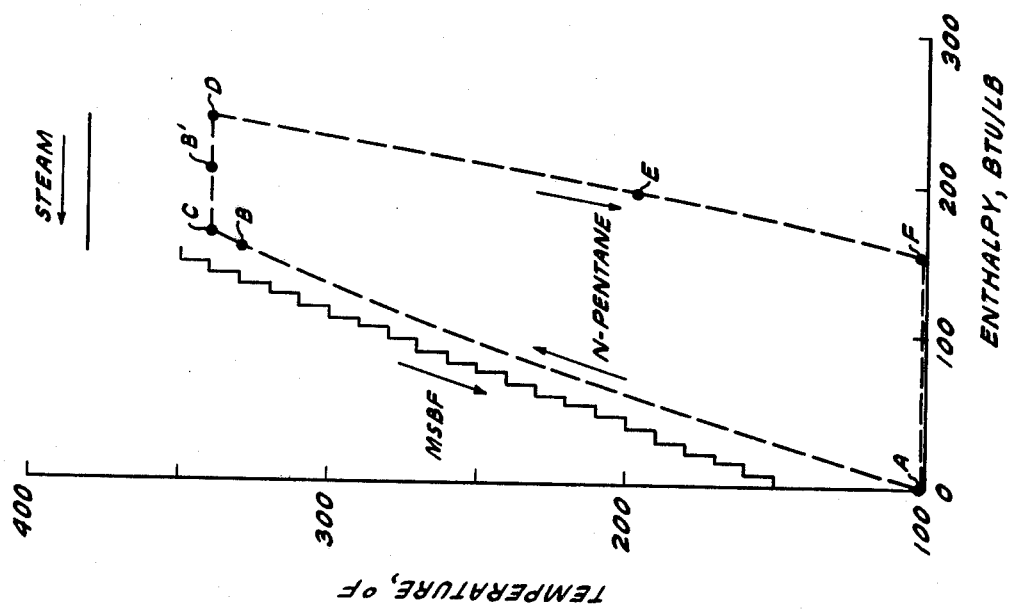
FIG. 6 is a temperature-enthalpy diagram illustrating the working fluid cycle of one embodiment of the method of this invention.

FIG. 6 illustrates the temperature enthalpy cycle of the working fluid wherein the abscissa is the fluid enthalpy in Btu/lb and the ordinate is the fluid temperature in degrees F. Starting at point A the working fluid is introduced into the MSBF and progressively heated, as a liquid, to point B at which point it exits the MSBF and is further heated by the steam produced in the partial flashing step. The working fluid is heated to its boiling point and then isothermally vaporized from point C to point D by indirect heat exchange with the steam. The n-pentane vapor, at about 340 psia and 330° F., is expanded through a turbine and exhausted at point E. The exhausted n-pentane is cooled and condensed in a condenser to return it via point F to starting point A. The temperature-enthalpy lines of the steam and the fluids in the MSBF are also shown in FIG. 6.

Mechanical energy is produced by the expansion of the working fluid through the turbine and the problems of precipitation, scaling and corrosion normally encountered in the processing of geothermal brines are minimized. The effluent brine can be treated to recover its mineral values prior to disposal. Although in this example the working fluid exits the MSBF as a heated liquid represented by point B, it will be understood of course that the working fluid may exit the MSBF as a liquid-vapor mixture, such as represented by point B', a vapor, such as represented by point D, or a superheated vapor as described previously. Additionally, the working fluid may be heated to or above its critical temperature during the heating cycle. At temperatures above its critical temperature, the working fluid will be a vapor regardless of the system pressure.

It is readily apparent from this disclosure that the method of this invention is extremely versatile and can be utilized to produce mechanical energy from a wide variety of geothermal brines by proper selection of the heat transfer fluid, working fluid and flash stage pressures. While particular embodiments of the invention have been described, it will be understood, of course, that the invention is not limited thereto since many obvious modifications can be made, and it is intended to include within this invention any such modification as will fall within the scope of the appended claims.

Having now described the invention, we claim:

1. A method for producing mechanical energy from geothermal brine, with comprises:
    producing hot geothermal brine from a subterranean geothermal reservoir;
    contacting said brine with a heat transfer fluid having a higher vapor pressure than said brine at the temperatures encountered;
    passing said heat transfer fluid and said brine cocurrently through a series of separate flash stages, wherein each successive stage is maintained at a lower pressure less than the vapor pressure of the fluids entering the stage so that at least a portion of the heat transfer fluid is flashed to vapor in each stage;
    countercurrently flowing a working fluid successively through said series of flash stages in indirect heat exchange with the vapor produced in each flash stage, whereby the vapor is condensed in each stage and said working fluid is progressively heated as it passes through said series of flash stages; and
    utilizing said working fluid in a heat engine to produce mechanical energy.

2. The method defined in claim 1 wherein the geothermal brine is produced and conducted to the first stage of said series of flash stages at a pressure exceeding its vapor pressure to maintain the brine in the liquid phase.

3. The method defined in claim 1 including partially flashing said brine to produce steam and residual brine prior to contact with said heat transfer fluid, and wherein the residual brine from the partial flashing is contacted with said heat transfer fluid.

4. The method defined in claim 3 including pressurizing said residual brine to prevent flashing of said brine prior to entry into said series of flash stages.

5. The method defined in claim 3 including heating said working fluid after its exit from said series of flash stages and prior to its entry into said heat engine by indirect heat exchange with said steam produced by said partial flashing, whereby said steam is condensed, and mixing the steam condensate with said residual brine prior to its entry into said series of flash stages.

6. The method defined in claim 1 wherein the temperature of said geothermal brine and said heat transfer fluid introduced into the first stage of said series of flash stages is above about 250° F.

7. The method defined in claim 1 wherein the pressure in each stage of said series of flash stages is maintained so that the brine is cooled by not more than about 35° F. per flash stage.

8. The method defined in claim 1 wherein the pressure in each stage of said series of flash stages is maintained so that the brine is cooled between about 1° F. and 10° F. per flash stage.

9. The method defined in claim 1 wherein the pressure in at least the last stage of said series of flash stages is subatmospheric.

10. The method defined in claim 1 wherein said heat transfer fluid is selected and the pressure in each stage of said series of flash stages is maintained so that less than 10 percent of the vapor produced in each flash stage is water vapor.

11. The method defined in claim 1 wherein the vapor condensed in each stage is collected and combined with the brine entering the subsequent stage.

12. The method defined in claim 1 wherein at least a portion of said working fluid is vaporized as it passes through said series of flash stages.

13. The method defined in claim 1 wherein said working fluid is a multicomponent fluid.

14. The method defined in claim 1 wherein said heat transfer fluid is substantially immiscible with said brine.

15. A method for producing mechanical energy from geothermal brine, which comprises:
    producing hot geothermal brine from a subterranean geothermal reservoir;
    initially contacting said brine with a heat transfer fluid having a higher vapor pressure than said brine at the temperatures encountered and being substantially immiscible with said brine;
    passing said heat transfer fluid and said brine cocurrently through a series of separate flash stages, wherein each successive stage is maintained at a lower pressure less than the vapor pressure of the fluids entering the stage so that at least a portion of the heat transfer fluid is flashed to vapor in each stage;
    countercurrently flowing a working fluid successively through said series of flash stages in indirect heat exchange with the vapors produced in each flash stage, whereby the vapor is condensed in each stage and said working fluid is progressively heated as it passes through said series of stages;
    collecting the condensate produced in each stage to prevent the mixing of said condensate with said brine in the same stage;
    contacting said condensate from each stage with the brine entering the subsequent stage;
    utilizing said working fluid in a heat engine to produce mechanical energy; and
    recycling the heat transfer fluid from the last stage of said series of flash stages to said initial contacting step.

16. The method defined in claim 15 including partially flashing said brine to produce steam and residual brine prior to contact with said heat transfer fluid, and pressurizing the residual brine prior to mixing with the heat transfer fluid to prevent flashing of said residual brine prior to entry into the first stage of said series of flash stages.

17. The method defined in claim 16 including heating said working fluid after its exit from said series of flash stages and prior to its entry into said heat engine by indirect heat exchange with said steam produced by said partial flashing, whereby said steam is condensed, and mixing the steam condensate with said residual brine prior to its entry into said series of flash stages.

18. The method defined in claim 15 wherein the temperature of said geothermal brine and said heat transfer fluid introduced into the first stage of said series of flash stages is above about 250° F. and wherein the pressure in each stage of said series of stages is maintained such that the brine is cooled by not more than about 35° F. per stage.

19. The method defined in claim 15 wherein the pressure in each stage of said series of flash stages is maintained so that the brine is cooled between about 1° F. and 10° F. per flash stage.

20. The method defined in claim 15 wherein said working fluid is a multicomponent fluid.

21. The method defined in claim 15 wherein at least a portion of said working fluid is vaporized as it passes through said series of flash stages.

22. The method defined in claim 15 wherein the pressure in at least the last stage of said series of flash stages is subatmospheric.

23. The method defined in claim 15 wherein the heat transfer fluid is chosen and the pressure of each flash stage is maintained such that no more than 10 percent of the vapor produced in each stage is water vapor.

24. A method for generating electrical power utilizing geothermal brine, which comprises:
producing hot geothermal brine from a subterranean geothermal reservoir;
partially flashing said brine to produce noncondensible gases and steam and residual brine;
pressurizing said residual brine to a superatmospheric pressure above its vapor pressure to maintain said residual brine in the liquid state;
initially contacting said residual brine with a heat transfer fluid comprising a saturated hydrocarbon having between about 3 and about 6 carbon atoms, wherein said heat transfer fluid is selected such that its vapor pressure is at least about eight times the vapor pressure of said residual brine at all temperatures encountered;
passing said heat transfer fluid and said residual brine cocurrently through a series of flash stages, wherein each successive stage is maintained at a lower pressure less than the vapor pressure of the fluids entering the stage, so that at least a portion of the heat transfer fluid is flashed to vapor in each stage and so that the brine is cooled by not more than about 35° F. per flash stage;
countercurrently flowing a multicomponent fluid successively through said series of flash stages in indirect heat exchange with the vapors produced in each flash stage, whereby the vapor is condensed in each stage and said multicomponent fluid is progressively heated and at least partially vaporized as it passes through said series of stages;
collecting the condensate produced in each stage to prevent the mixing of said condensate with said brine in the same stage;
contacting said condensate from each stage with the brine entering the next stage;
further heating said multicomponent fluid after its exit from said series of flash stages by indirect heat exchange with said steam produced during said partial flashing of said brine, thereby condensing said steam to steam condensate;
utilizing said multicomponent fluid to drive a turbine for generation of electrical power; and
recycling the heat transfer fluid condensate from the last stage of said series of flash stages to said initial contacting step.

25. The method defined in claim 24 wherein said multicomponent fluid is completely vaporized prior to leaving said series of flash stages and is superheated by indirect exchange with said steam.

26. The method defined in claim 24 including the steps of condensing said multicomponent fluid discharged from the turbine and returning said multicomponent fluid to said series of flash stages.

27. The method defined in claim 24 including pressurizing the steam condensate produced during said further heating of said multicomponent fluid and mixing said steam condensate with said residual brine prior to its entry into said series of flash stages.

28. The method defined in claim 27 including separating said non-condensible gases from said steam condensate prior to mixing said steam condensate with said residual brine.

* * * * *